Figure 1:
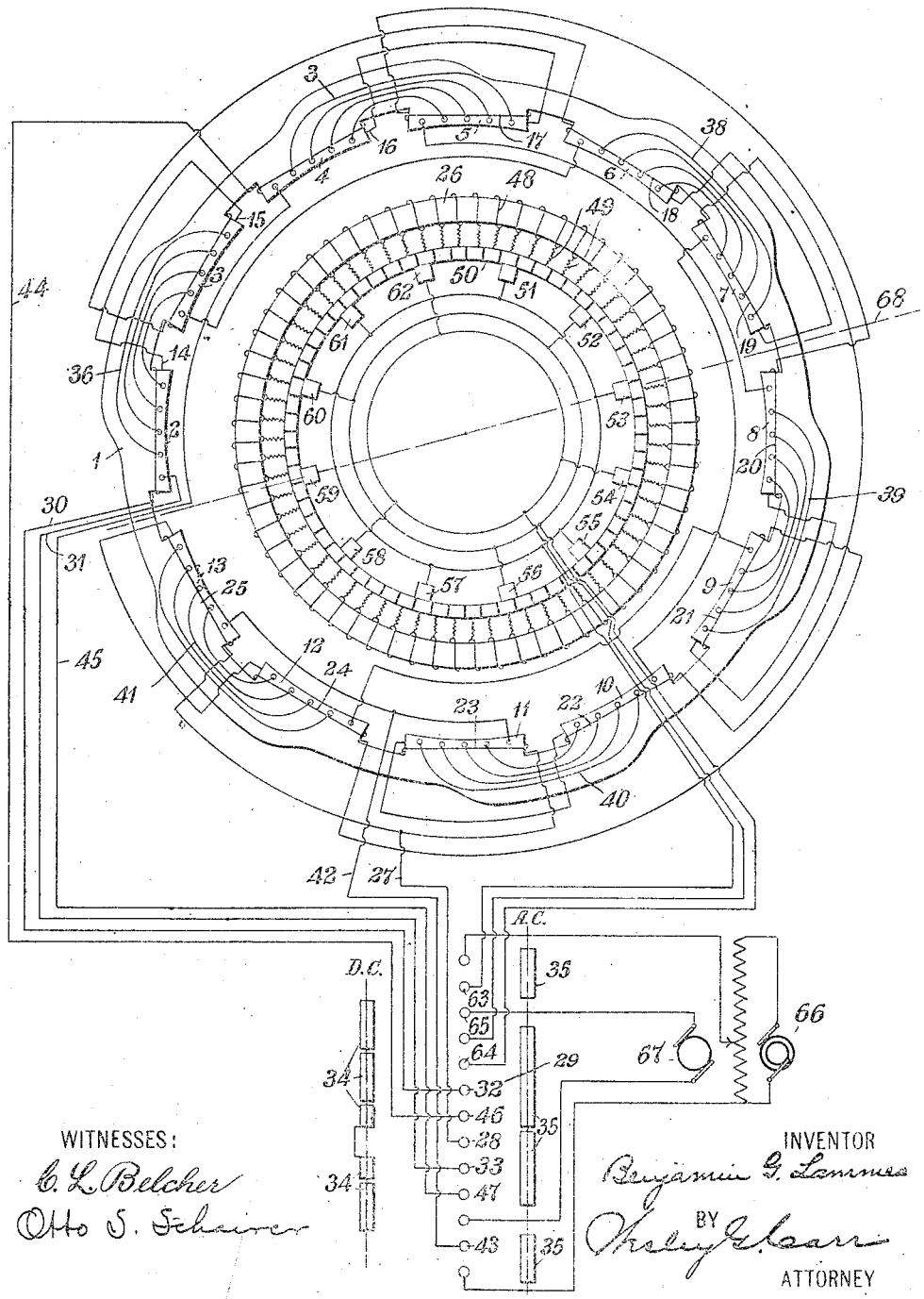

B. G. LAMME.
ELECTRIC MOTOR.
APPLICATION FILED JAN. 26, 1910.

1,151,804.

Patented Aug. 31, 1915.
4 SHEETS—SHEET 1.

WITNESSES:
C. L. Belcher
Otto S. Schuser

INVENTOR
Benjamin G. Lamme
BY
[signature]
ATTORNEY

B. G. LAMME.
ELECTRIC MOTOR.
APPLICATION FILED JAN. 26, 1910.

1,151,804.

Patented Aug. 31, 1915.
4 SHEETS—SHEET 2.

WITNESSES:
C. L. Belcher
Otto S. Schairer

INVENTOR
Benjamin G. Lamme
BY
Irley E. Carr
ATTORNEY

B. G. LAMME.
ELECTRIC MOTOR.
APPLICATION FILED JAN. 26, 1910.

1,151,804.

Patented Aug. 31, 1915.
4 SHEETS—SHEET 3.

WITNESSES:
C. L. Belcher
Otto S. Schairer

INVENTOR
Benjamin G. Lamme
BY
ATTORNEY

B. G. LAMME.
ELECTRIC MOTOR.
APPLICATION FILED JAN. 26, 1910.

1,151,804.

Patented Aug. 31, 1915.
4 SHEETS—SHEET 4.

WITNESSES:
C. L. Belcher
Otto S. Schaiser

INVENTOR
Benjamin G. Lamme
BY
Ashley G. Carr
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC MOTOR.

1,151,804.  Specification of Letters Patent.  Patented Aug. 31, 1915.

Application filed January 26, 1910. Serial No. 540,185.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Electric Motors, of which the following is a specification.

My invention relates to electric motors and particularly to such motors as may be operated by either alternating or direct currents.

The object of my invention is to provide a motor having such structural and electrical characteristics that it may be operated efficiently by either alternating or direct currents.

Electric railway vehicles are frequently equipped with propelling motors that may be supplied with either alternating or direct currents in order that they may be operated over existing direct current railway systems in cities or towns, and over alternating current systems in rural and interurban districts where it is more economical to transmit the power over the longer distances by means of high-voltage alternating current, the transmission voltage, in the latter case, being reduced upon the vehicle to that which is suitable for application to the motors. For the most advantageous operation of the motors by alternating currents, the voltage applied thereto should not exceed half that of most direct current systems, so that, in passing from a direct current to an alternating current section of a system, or vice versa, it is necessary, or at least desirable, to change the voltage which is applied to the motors.

According to the present invention, a motor is so constructed and its circuits are so controlled that, for the same speed and field strength, a higher voltage may be applied thereto when it is operated by direct current than when it is operated by alternating current, and the most economical and efficient conditions of operation may be secured with each character of current. In order to effect this result, the motor is provided with a larger number of field poles when it is supplied with alternating current than when it is supplied with direct current, and also with a ring armature that readily permits of such a change in the number of poles. The motor is further provided with an auxiliary winding for neutralizing the armature reaction, the said winding being so arranged that it is effective for both numbers of field poles. The change in the number of field poles causes greater amounts of flux to traverse certain portions of the field yoke with the smaller number of poles than traverse the said portions with the larger number of poles, and the said portions are, accordingly, made of larger cross-sectional area than the remaining portions of the field yoke. For certain conditions of operation, it may be desirable to provide for greater field strength in the motors for direct current operation than for alternating current operation, such provision being also made according to one modification of my invention.

Figure 2:
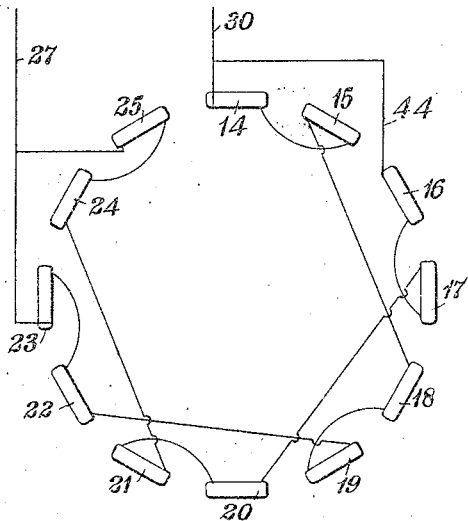
Figure 3:
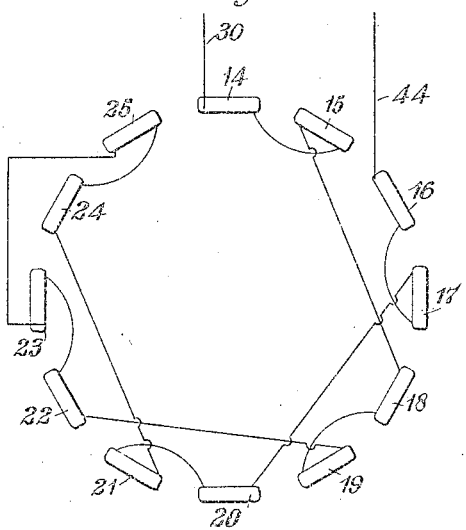
Figure 4:
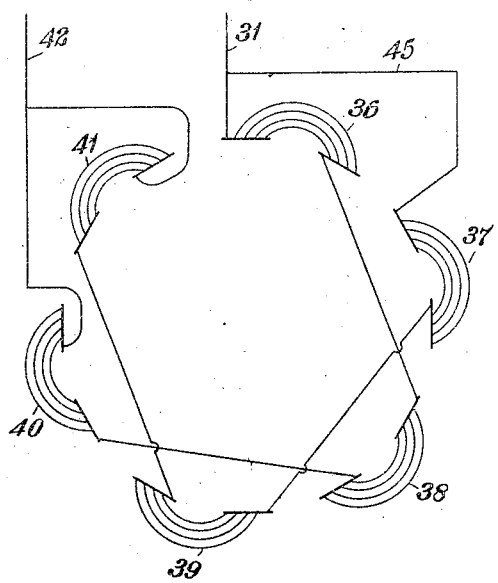
Figure 5:
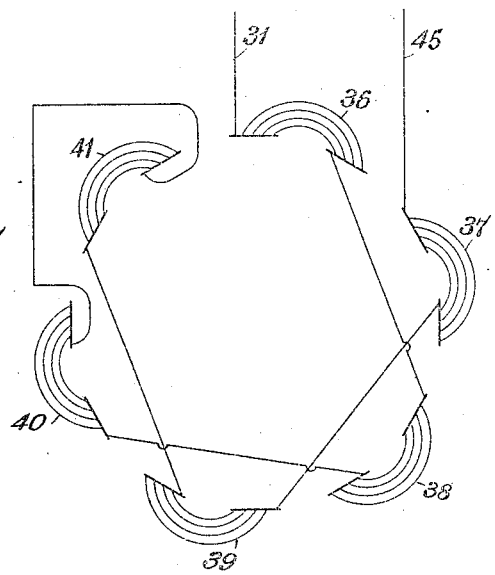
Figure 6:
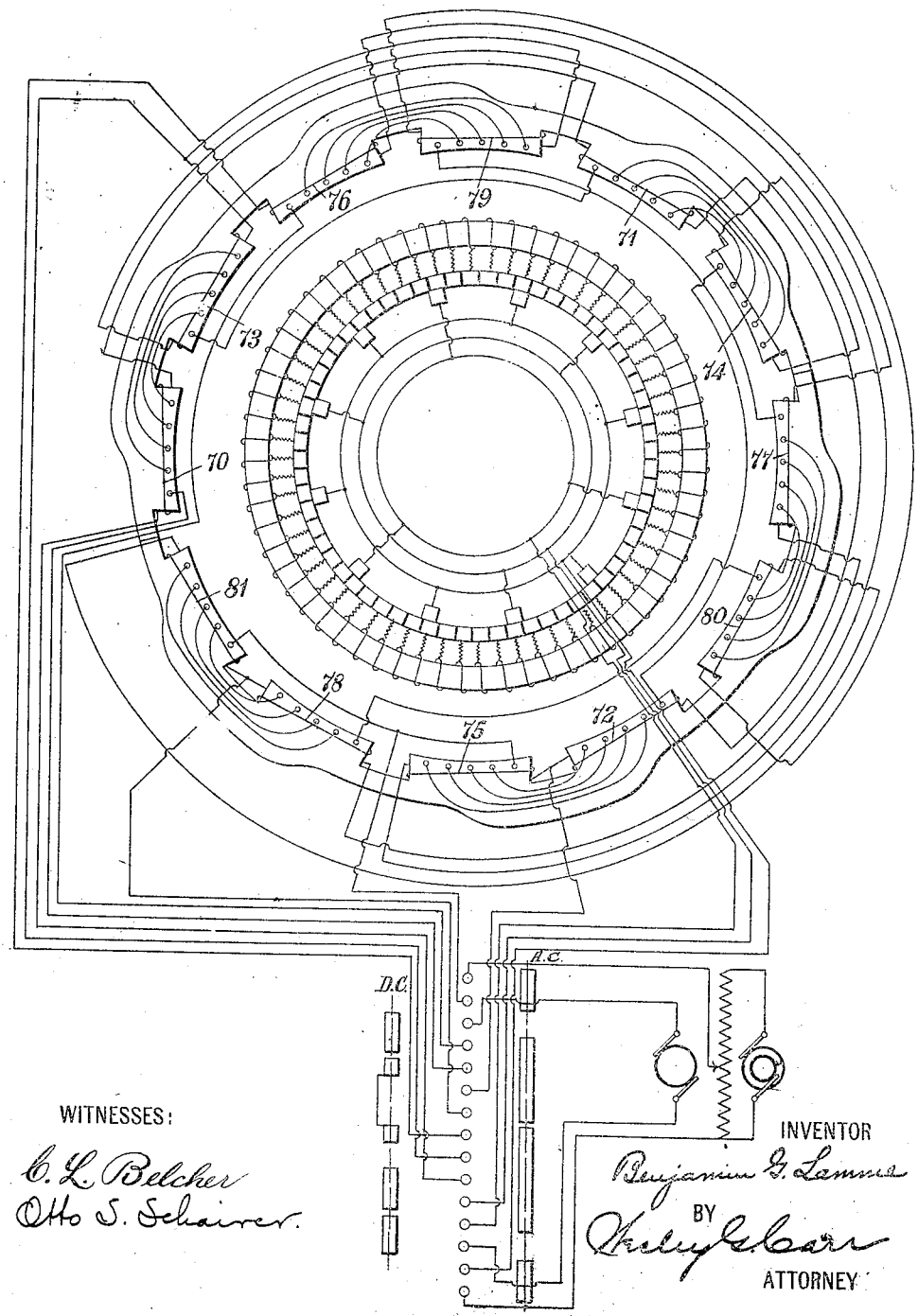
Figure 7:
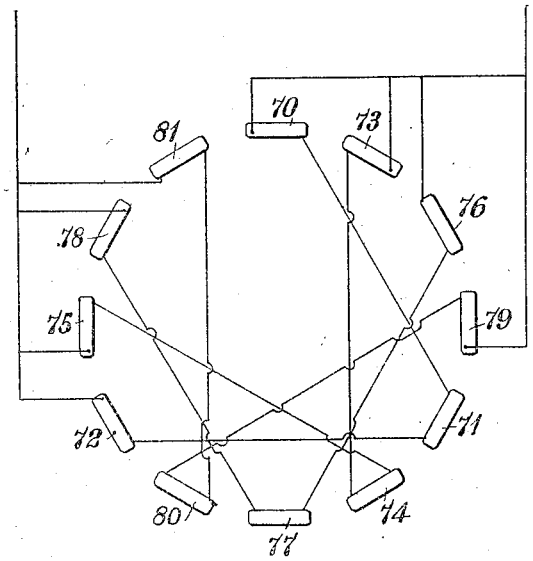
Figure 8:
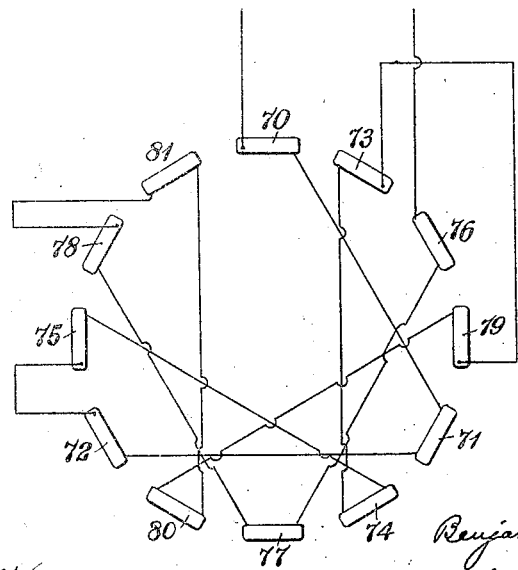

My invention is illustrated in the accompanying drawings, Figure 1 of which illustrates, diagrammatically, a motor embodying my invention, with means for changing its circuit connections to adapt it for operation by either alternating or direct currents. Fig. 2 is a simplified diagrammatic view illustrating the connections of the main field winding when arranged for alternating current operation, and Fig. 3 is a similar view of said winding when arranged for direct current operation. Fig. 4 is a simplified diagrammatic view of the auxiliary or neutralizing winding of the motor when arranged for alternating current operation, and Fig. 5 is a similar view of the said winding when arranged for direct current operation. Fig. 6 is a diagrammatic view of a motor embodying a modification of the invention with means for arranging its circuit connections for either alternating or direct current operation. Fig. 7 is a simplified diagrammatic view of the main field winding of the motor of Fig. 6 when arranged for alternating current operation, and Fig. 8 is a similar view of the said winding when arranged for direct current operation.

The motor comprises a field magnet frame 1 having internal polar projections 2 to 13, inclusive, that are respectively provided with energizing coils 14 to 25, inclusive, a ring armature 26 being mounted for rotation within the field magnet frame. In order that the motor may be provided with a greater number of field poles for alternating current operation than for direct current operation, the coils 14 to 25, inclusive, are connected in series in two sets that respectively comprise the coils on alternate pairs of poles. The successive coils of each set are arranged to cause the corresponding poles to be of opposite sign or polarity.

A common terminal 27 of the two sets of coils is connected to a stationary contact terminal 28 of a controller 29, whereby the circuits of the motor may be readily adapted for operation of the motor by either alternating or direct currents, and the remaining terminals 30 and 31 of the two sets of field coils are respectively connected to stationary contact terminals 32 and 33 of the controller.

The controller 29 comprises, in addition to a set of stationary contact terminals, two sets 34 and 35 of movable conducting segments that are adapted to engage the stationary contact terminals, the circuits of the motor being arranged for alternating current operation when the segments 35 upon the line A—C engage the stationary contact terminals, and for direct current operation when the segments 34 upon the line D—C engage the stationary contact terminals. Thus, for alternating current operation, the two sets of field coils are connected in parallel relation, as indicated in Fig. 2, and the arrangement is such that adjacent polar projections are of different polarity. The field, accordingly, has twelve, or its maximum number of poles. For direct current operation, however, the two sets of field coils are connected in series relation, and are so arranged that the poles produced by alternate pairs of coils, viz., 4, 5; 8, 9; and 12, 13 are reversed and of different polarity from those produced when the coils are connected for direct current operation. Thus, polar projections 3, 4; 7, 8; and 11, 12 are of the same polarity, and the remaining poles are of opposite polarity, the total number of poles being six, or just half the number of poles employed for alternating current operation. The latter arrangement of the coils is clearly shown in Fig. 3.

The field frame is also provided with an auxiliary winding for neutralizing the armature reaction, which winding consists of six groups of coils 36, 37, 38, 39, 40 and 41, the side or inductor portions of which are located in slots at the extremities of the polar projections, and the end portions of which connect all of the inductor portions in each polar projection to all of the inductor portions in one of the adjacent polar projections. In this respect, the arrangement of the coils is novel, since, in structures heretofore provided, one-half of the coils associated with each polar projection extend therefrom to the next adjacent on one side, and the other half extend to the next adjacent upon the other side.

With the present arrangement, the neutralizing winding may be readily and conveniently connected so that it will be effective with both numbers of field poles, as will be explained presently, whereas, it could not be done if the winding were arranged in the customary manner. The coils of the neutralizing winding are arranged in two sets, the one set comprising groups of coils 36, 38 and 40 and the other set comprising groups of coils 37, 39 and 41.

A common terminal 42 of the two sets of coils is connected to contact terminal 43 of the controller 29, and the remaining terminals 44 and 45 thereof are connected, respectively, to contact terminals 46 and 47 of the controller 29. The construction of the controller 29 is such that when the segments 35 upon the line A—C engage the stationary contact terminals—under which condition the circuits are arranged for alternating current operation—the two sets of coils of the neutralizing winding are connected in parallel relation, as illustrated in a simple manner in Fig. 4. When the controller segments 34 in the line D—C engage the stationary contact terminals—under which condition the circuits of the motor are arranged for direct current operation—the coils of the neutralizing winding are all connected in series, the current being reversed in the groups of coils 37, 39 and 41 from the direction in which it traversed the said coils when the circuits of the motor were arranged for alternating current operation.

Since, as hereinafter explained, the voltage applied to the motor for alternating current operation is approximately one-half that applied thereto for direct current operation, for the same output of the motor, the armature current for alternating current operation will be double that for direct current operation, and, consequently, the current traversing the neutralizing winding, which is connected in series with the armature, will be one-half, for direct current operation, what it is for alternating current operation. The ampere-turns or demagnetizing effect of the neutralizing winding should, of course, be the same, irrespective of the voltage applied to the motor, and it is for this reason that the two sets of coils of the neutralizing winding are connected in parallel relation for alternating current operation and in series relation for direct current operation.

The armature 26 is provided with a winding 48 that is connected, by means of suitable resistance leads 49, to the segments of a commutator cylinder 50, upon which bear three sets of brushes 51 to 62, inclusive, one set comprising alternate brushes 51, 53, 55, 57, 59 and 61, the second set comprising brushes 52, 56 and 60, and the third set comprising brushes 54, 58 and 62. Brushes 51, 53, 55, 57, 59 and 61 of the first set are so located as to be ineffective when the circuits of the main field magnet winding are arranged to produce the smaller number of poles, i. e., for direct current operation. The brushes of the respective sets are connected together, and the first set is connected to stationary contact terminal 63 of the controller 29, the second set to stationary contact terminal 64, and the third set to stationary contact terminal 65 of the controller 29. When the controller segments in the line A—C engage the stationary contact terminals, the brushes 51, 53, 55, 57, 59 and 61 of the first set constitute one terminal of the armature, and the other two sets of brushes are connected together and constitute the other terminal of the armature. Under this condition, the field has the larger number of poles, and the counter-electromotive force of the armature is accordingly that generated in the portion of its winding which extends between adjacent brushes. However, when the segments of the controller upon the line D—C engage the stationary contact terminals, the brushes 51, 53, 55, 57, 59 and 61 of the first set are not connected with other parts, and the other two sets of brushes severally constitute the terminals of the armature circuit. Under this condition, the field has the smaller number of poles, and the counter-electromotive force of the armature is that generated in the portion of its winding which extends between alternate commutator brushes. With the same field strength and speed for both direct and alternating current operation, the counter-electromotive force of the armature will, accordingly, be greater for direct current than for alternating current operation, and the voltage applied to the motor should be double for direct current operation what it is for alternating current operation.

The controller 29 serves not only to govern the circuit connections of the various windings of the motor, but it also serves to connect the said windings all in series, both for alternating and direct current operation, and to connect the motor either to a suitable source 66 of alternating current or to a source 67 of direct current, according as the movable segments thereof upon the line A—C or the line D—C engage the stationary contact terminals, it being understood that the alternating current voltage is usually less than, or approximately one-half, the direct current voltage.

With the main field coils arranged as illustrated in Fig. 1, the ampere-turns or magnetizing effect of the field windings will be the same for both alternating and direct current operation, since the field current for alternating current operation is double that for direct current operation, while the sets of field coils are changed from parallel relation, for alternating current operation, to series relation for direct current operation, and the alternating current voltage is approximately half the direct current voltage. The field flux, therefore, is the same for both alternating and direct current operation, but the amount that will traverse the yoke of the field frame between polar projections 2 and 3, 4 and 5, 6 and 7, 8 and 9, 10 and 11, and 12 and 13 will be twice as much for direct current operation as for alternating current operation. In order that the reluctance of these portions of the magnetic circuit may not be excessive for direct current operation, they are increased in cross-sectional area, the remaining portions being only of sufficient cross-sectional area to carry the flux for alternating current operation. The field structure is therefore of the minimum dimensions for effective operation.

In order to permit of opening the field frame for the removal of the armature or for other purposes, it may be split in a plane indicated by a line 68, which passes through the field frame between the polar projections where the yoke is of the smallest cross-sectional area, there being no flux in these parts during direct current operation. With the coils of the neutralizing winding arranged as illustrated, the frame of the motor may also be opened without severing or disconnecting any of the said coils.

For certain conditions of operation, it may be desirable to provide a field for direct current operation that shall be double that provided for alternating current operation, and, in Fig. 6 I have shown a motor provided with a field winding adapted to produce this result, together with a controller for properly arranging the field connections. In this motor, the field coils are arranged in four sets, in each of which the coils are connected in series, the first set comprising coils 70, 71 and 72, the second set, coils 73, 74 and 75, the third set, coils 76, 77 and 78, and the fourth set, coils 79, 80 and 81. For alternating current operation, the segments of the controller that lie upon the line A—C, engage the stationary contact terminals thereof, and the armature, the neutralizing winding and the field coils are all connected in series relation, as in Fig. 1, but the four sets of field coils are connected in parallel relation in such manner that adjacent polar projections are of different polarity, as illustrated in Fig. 7. The field then has twelve, or the maximum number of poles. For direct current operation, the segments of the controller that lie upon the line D—C, engage the stationary contact terminals, and the four sets of field coils are then connected in series relation, the current being reversed in coils 73, 74, 75, 79, 80 and 81, so that the corresponding poles are of one polarity and the remaining poles are of the opposite polarity, there being six poles in all. If the direct current voltage is double the alternating current voltage, the direct current will be half the alternating current for the same power. All of the coils are in series, however, whereas, for alternating current operation, they are arranged in four parallel groups. Therefore, the field ampere-turns are double, for direct current operation, what they are for alternating current operation. The structural features of the motor of Fig. 6 are otherwise the same as those of the motor of Fig. 1.

I claim as my invention:

1. The combination with a dynamo-electric machine adapted for operation by either alternating or direct currents, comprising a field magnet structure, an armature winding and a commutator, of means for producing a greater number of field poles for alternating current operation than for direct current operation and for connecting either of the sources of current to the armature winding through said commutator.

2. The combination with a dynamo-electric machine adapted for operation by either alternating or direct currents, comprising a field magnet structure, a main winding therefor, an armature winding, a neutralizing winding and a commutator, of means for arranging the main winding to produce a greater number of poles for alternating current operation than for direct current operation, for arranging the neutralizing winding to be effective for either number of poles and for connecting either of the sources of current to said armature winding through said commutator.

3. In a dynamo-electric machine adapted for operation by either alternating or direct currents, the combination with a field magnet structure having polar projections, a main winding surrounding the polar projections, and an auxiliary winding extending between the polar projections, of means for adjusting the connections of the main winding to produce a greater number of field poles for alternating current operation than for direct current operation, and to render the auxiliary winding effective for either number of poles.

4. A dynamo-electric machine adapted for operation by either alternating or direct currents comprising a field magnet structure and means for producing therein a greater number of field poles of less strength for alternating current operation than for direct current operation.

5. The method of operating an electric motor by either alternating or direct currents which consists in applying to the motor a higher alternating than direct electromotive force, in producing a greater number of field poles in the motor for alternating current operation than for direct current operation and in commutating the armature currents for both conditions of operation.

6. The method of operating an electric motor by either alternating or direct currents which consists in producing in the motor a greater number of field poles of less strength for alternating current operation than for direct current operation.

7. The method of operating an electric motor by either alternating or direct currents which consists in commutating the armature currents for both conditions of operation, and producing a greater number of field poles in the motor for alternating current operations than for direct current operation.

8. The method of operating an electric motor by either alternating or direct currents which consists in commutating the armature currents for both conditions of operation, and changing the connections of the field magnet winding of the motor to produce a greater number of field poles in the motor for alternating current operation than for direct current operation.

9. The method of operating an electric motor having a plurality of field coils by either direct or alternating currents which consists in commutating the armature currents for both conditions of operation, and connecting the field magnet coils in series for direct current operation and in parallel to produce a greater number of field poles for alternating current operation.

10. The method of operating an electric motor having a plurality of field magnet coils by either direct or alternating currents which consists in connecting the coils in series for direct current operation and in parallel to produce a greater number of field poles of less strength for alternating current operation.

11. The combination with a dynamo-electric machine adapted for operation by either alternating or direct currents and having a plurality of field magnet coils, an armature, and a commutator, of means for connecting the said coils in series relation for direct current operation and in parallel relation to produce a greater number of field poles for alternating current operation, and for connecting the commutator in series with the source of current under both conditions of operation.

12. The combination with a dynamo-electric machine adapted for operation by either alternating or direct currents and having a plurality of field magnet coils, an armature, and a commutator, of means for connecting the said coils in series relation for direct current operation and in parallel relation to produce a greater number of field poles of less strength for alternating current operation, and for connecting the commutator in series with the source of current under both conditions of operation.

13. A dynamo-electric machine adapted for operation by either alternating or direct currents comprising series-connected field magnet and armature windings, and means for arranging the field magnet winding to produce a greater number of field poles for alternating-current operation than for direct-current operation.

14. A dynamo-electric machine adapted for operation by either alternating or direct currents comprising series-connecting field magnet and armature windings, and means for arranging the field magnet winding to produce a greater number of field poles of less strength for alternating-current operation than for direct-current operation.

15. The combination with a dynamo-electric machine adapted for operation by either alternating or direct currents, comprising field magnet and armature windings connected in series, of sources of alternating and direct currents, and a controller for connecting said windings to said sources of current and for arranging the field magnet windings to produce a greater number of poles for alternating-current operation than for direct-current operation.

16. The combination with a dynamo-electric machine adapted for operation by either alternating or direct currents, comprising series-connected field magnet and armature windings and a commutator, of sources of alternating and direct currents, and a controller for connecting either of said sources to said windings through said commutator and for controlling the number of poles produced by said field magnet winding in accordance with the source to which the windings are connected.

17. The combination with a dynamo-electric machine adapted for operation by either alternating or direct currents, comprising series-connected field magnet and armature windings and a commutator, of sources of alternating and direct currents, and a controller for connecting either of said sources to said windings through said commutator and for simultaneously controlling the number of poles produced by said field magnet winding in accordance with the source to which the windings are connected.

In testimony whereof, I have hereunto subscribed my name this 19th day of Jan., 1910.

BENJ. G. LAMME.

Witnesses:
   E. LIVINGSTONE,
   B. B. HINES.